United States Patent [19]

Brown et al.

[11] 4,237,484

[45] Dec. 2, 1980

[54] TECHNIQUE FOR TRANSMITTING DIGITAL DATA TOGETHER WITH A VIDEO SIGNAL

[75] Inventors: Earl F. Brown, Piscataway; Arun N. Netravali, Matawan, both of N.J.

[73] Assignee: Bell Telephone Laboratories, Incorporated, Murray Hill, N.J.

[21] Appl. No.: 64,918

[22] Filed: Aug. 8, 1979

[51] Int. Cl.³ .............................................. H04N 7/08
[52] U.S. Cl. ..................................................... 358/142
[58] Field of Search ................ 358/142, 135, 143, 146

[56] References Cited

U.S. PATENT DOCUMENTS

| | | | |
|---|---|---|---|
| 2,266,194 | 12/1941 | Guanella | 358/143 |
| 2,921,124 | 1/1960 | Graham | 358/138 |
| 3,456,071 | 7/1969 | Jackson et al. | 358/146 |
| 3,586,767 | 6/1971 | Morchand | 358/146 |
| 3,637,926 | 1/1972 | Morchand | 358/142 |
| 3,769,451 | 10/1973 | Connor | 358/135 |
| 3,848,082 | 11/1974 | Summers | 358/146 |
| 3,924,060 | 12/1975 | Bedford | 358/142 |
| 3,940,555 | 2/1976 | Amano et al. | 358/135 |
| 3,984,624 | 10/1976 | Waggener | 358/142 |

Primary Examiner—Robert L. Griffin
Assistant Examiner—Michael A. Masinick
Attorney, Agent, or Firm—Barry H. Freedman

[57] ABSTRACT

Supplementary digital data is encoded together with a video signal by predicting the intensity values of a first set of video samples, compressing the range of the prediction errors and superimposing a value indicative of the supplementary data on the compressed value. The samples in the first set may be selected in a regular sequence or asynchronously in accordance with a function of the video signal such as the slope in the area of the picture being processed; the composite values are time multiplexed with the remaining intensity values.

15 Claims, 5 Drawing Figures

ENCODER

DECODER

TECHNIQUE FOR TRANSMITTING DIGITAL DATA TOGETHER WITH A VIDEO SIGNAL

TECHNICAL FIELD

The present invention relates to a method and apparatus for encoding a supplementary digital signal together with a video signal and for decoding the resulting combined signal. The video signal can be a facsimile or television signal which exhibits a high degree of correlation. The digital data can represent any other data which is independent of the video signal.

BACKGROUND OF THE INVENTION

Numerous systems have been devised to combine data from an independent source with a video signal so as to allow simultaneous transmission of the two types of information without seriously degrading the picture quality. These systems generally rely on two properties: first, that a good deal of the information content of an unprocessed video signal is redundant and need not be encoded, and second, that intentional distortions of a video signal can be tolerated by the visual integration performed by the observer, provided that the site and amount of distortion are judiciously selected. Examples of such prior art systems are described in U.S. Pat. No. 2,266,194 issued to G. Guanella on Dec. 16, 1941 and patent 3,456,071 issued to R. N. Jackson et al on July 15, 1969, both of which provide for time multiplexing of a visually imperceptible supplementary signal together with a video signal. In accordance with the technique described by Jackson and Guanella, the added data totally replaces the video information at the locations at which it is inserted. When the video signal is reconstructed, a certain amount of resolution is therefore lost, and this factor must be taken into account in the tradeoff between the amount of supplementary data that can be added and the permissible picture degradation.

Other techniques that have been used to combine supplementary data with a video signal include inserting the data in the horizontal flyback interval, which is a form of time division multiplexing, or the more conventional use of TDM wherein the video signal is converted to digital form, compressed using any one of numerous compression strategies, and wherein the supplementary information is then inserted in the time slots made available by compression. These techniques, which require transmission of data in digital form, suffer in that the error tolerance of the transmission medium is smaller than for analog transmission, and costly error correcting circuits may be required. Frequency division multiplexing, which is another alternative, requires filtering which can also be expensive and complex.

In view of the foregoing, it is the broad object of the present invention to enable transmission of a supplementary digital signal together with a video signal, without unduly distorting the latter. The encoding is to be accomplished so that analog transmission is possible. However, some of the internal processing within the encoder may be digital or analog, as desired.

SUMMARY OF THE INVENTION

In accordance with the present invention, the video signal is applied to a predictive encoder which predicts the value of each of a first set of samples thereof, based upon the value of other ones of the samples. The predicted and true values of the samples in the first set are compared, and the resulting error values are compressed to a narrower range. A value indicative of the supplementary data is then superimposed upon the compressed values, and the composite value is time multiplexed with the remaining samples of the input video signal. If digital processing is used within the encoder, the signal is reconverted to analog form prior to transmission.

At the receiver, the composite samples (with superimposed data) are demultiplexed from the remaining data, and the supplementary data is extracted or "stripped" from these samples. The "stripped" error value is then expanded in a process which is the reverse of the compression process used in the encoder. Finally, the expanded error value is combined with a predicted value to yield the reconstructed video signal. The samples in the first set can comprise alternate samples (e.g., all odd samples), or another predefined regular sequence of samples, or can be determined asynchronously as a function of the video signal itself.

DESCRIPTION OF THE DRAWING

The present invention will be more fully appreciated from the following detailed description when read in light of the accompanying drawing in which.

DETAILED DESCRIPTION

Figure 1:
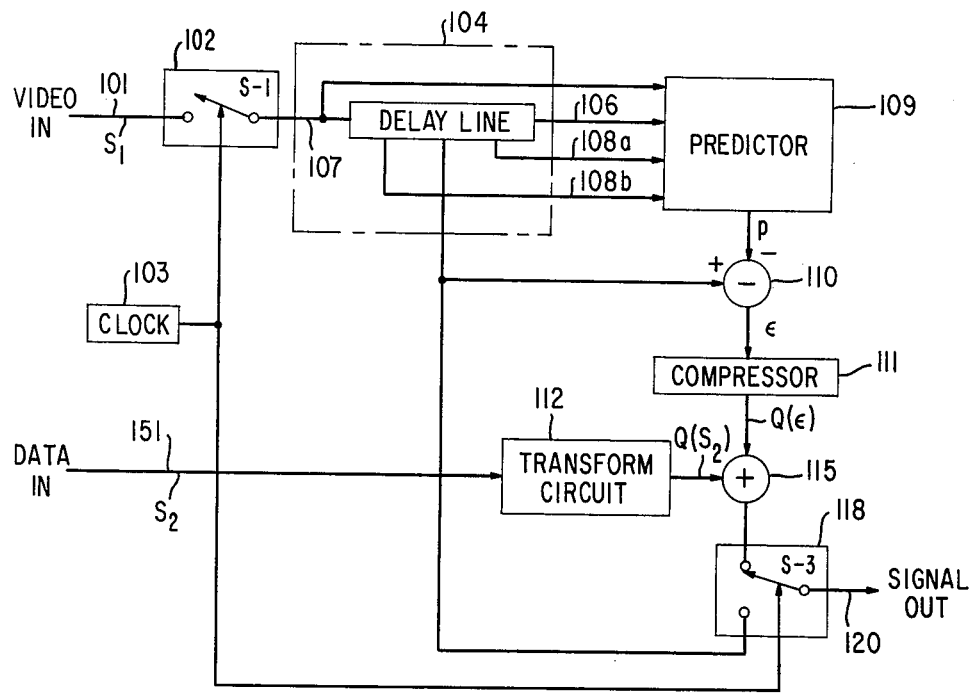
FIG. 1 is a block diagram of an encoder constructed in accordance with the present invention.

In FIG. 1, a video signal $S_1$ is received on line 101 and a supplementary data signal $S_2$ is received on line 151. For purposes of explanation, it will be assumed that the video signal is obtained by scanning each frame or field of a picture in a conventional manner, i.e., along a series of scan lines. However, video signals derived from other scan patterns can also be processed in a similar fashion. The supplementary data signal, which can represent information obtained from any independent source, is generally represented in binary form. Appropriate buffering (not shown) is provided between the data source and line 151.

The video signal on line 101 is sampled at as appropriate (Nyquist) rate by closing switch 102 under the control of a sampling clock 103. Each sample thus represents the intensity value at a particular picture element (pel) location in the picture being encoded. The samples are applied to a delay element 104 in order to make the intensity values for a series of pels simultaneously available. In the embodiment of FIG. 1, element 104 comprises a tapped delay line which provides a plurality of samples to predictor circuit 109.

Figure 2:
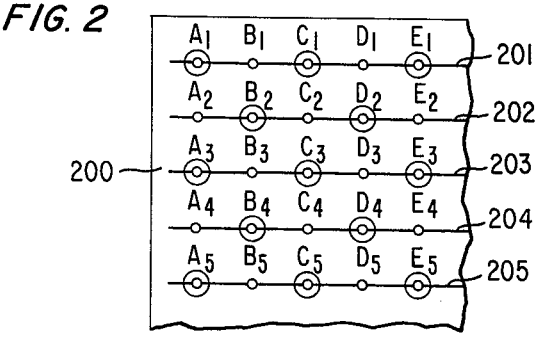
FIG. 2 illustrates the picture elements in a portion of a picture frame being encoded.

The samples stored in delay element 104 are used, in accordance with the invention, to predict the intensity values of a first set of the samples that correspond to some of the elements of the picture being encoded. As shown in FIG. 2, the area within block 200 represents one field or frame of a picture being processed and lines 201–205 represent some of the parallel scan lines used to obtain the input intensity signal. Each scan line includes a plurality of picture elements A through E which are the locations in the picture at which the intensity signal $S_1$ is sampled. Pels $A_1$ through $E_1$ are located on scan line 201, pels $A_2$ through $E_2$ are on scan line 202, and so on. In accordance with one embodiment of the invention, the samples in the first set (for which a prediction is made) may be synchronously selected so as to correspond to alternate pels on each scan line, with the pels in adjacent lines being offset by one pel. Thus, in FIG. 2, samples which correspond to the circled pels $A_1$, $C_1$, $E_1$ on line 201 are in the first set, as well as samples associated with pels $B_2$ and $D_2$ in line 202, pels $A_3$, $C_3$ and $E_3$ in line 203, and so on.

A predicted intensity value for each of the samples in the first set is determined by averaging or interpolating between the intensity values of pels that neighbor or surround the particular pel for which the intensity value is being predicted. For example, the intensity $I_{B2}$ for pel $B_2$ is predicted using the intensity values $I_{A2}$, $I_{C2}$, $I_{B1}$ and $I_{B3}$ of pels $A_2$, $C_2$, $B_1$ and $B_3$, respectively. Similarly, the predicted intensity $\hat{I}_{C3}$ for pel $C_3$ can be represented as the average of the intensities of the neighboring pels: $\hat{I}_{C3} = (I_{C2} + I_{C4} + I_{B3} + I_{D3})/4$. Intensity values for pels on the perimeter of the picture are predicted either by using the intensities of the three surrounding pels (two pels in the case of corner pel $A_1$) or by assuming a predetermined intensity value for a one pel wide band surrounding the picture area within block 200.

Delay element 104 can be implemented as a tapped delay line having a total delay time from input to output of $2\tau$, where $\tau$ is the scan interval for one picture line. Output 105 represents the midpoint of the delay line, so that when the current sample is available at output 105, output 106 contains the sample corresponding to the pel on the preceding scan line, and input 107 contains the sample corresponding to the pel on the following scan line. Concurrently, the outputs on taps 108a and 108b represent the samples immediately before and after the current sample, respectively. The outputs on taps 108a and 108b as well as the samples on output 106 and input 107 are coupled to predictor 109 which, as stated previously, may comprise a simple averaging circuit. Other predictor arrangements can be used with other combinations of outputs from element 104, if desired.

The predicted intensity value p output from predictor 109 is subtracted from the actual intensity value of the same pel in a subtractor circuit 110, which supplies the error signal $\epsilon$ thus generated to a compressor 111, which serves two functions. First, compressor 111 reduces the dynamic range of the error signal such that the supplementary digital data may be superimposed thereon. Second, the compressor has a nonlinear input/output characteristic which allows more precision during encoding of statistically expected input levels and less precision for encoding less frequently encountered input values.

Figure 3:
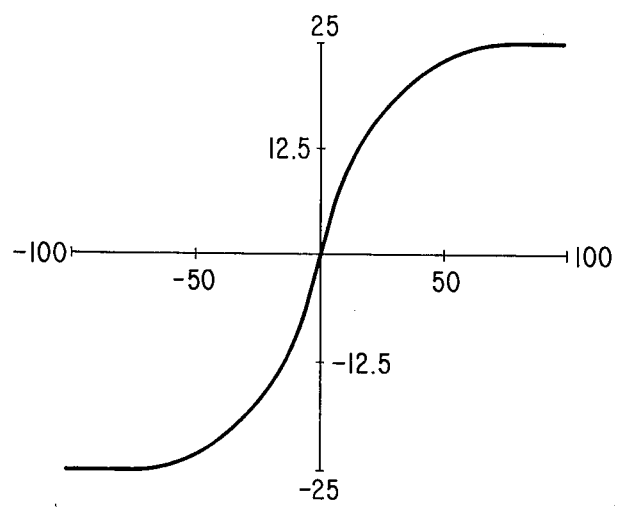
FIG. 3 illustrates a typical input-output characteristic for compressor 111 of FIG. 1.

FIG. 3 illustrates one possible input/output characteristic for compressor 111. Assuming that the input signal $S_1$ may range between 0 and 100 units, the error signal $\epsilon$ input to quantizer 111 can range between $-100$ and $+100$ units. In accordance with the invention, the output $Q(\epsilon)$ of the compressor of FIG. 3 is limited to the range between $-25$ and $+25$ units, thereby indicating a compression ratio of approximately 4:1. The compression is not linear: for small inputs, the input/output ratio is nearer to unity, while for higher values, the ratio increases. This nonlinearity is desirable, since the prediction errors tend to be small in flat areas of the picture, and better results are desirably obtained here. In active picture areas, step sizes are larger and the distortion caused by compression is thus greater, but these errors are masked by the busy picture. The perceptual responses of the eye are not as sensitive to errors in these areas of the picture. If digital rather than analog processing is used within the encoder of FIG. 1, compressor 111 may be replaced with a symmetrical quantizer with the same compression ratio. The number and selection of step sizes can be determined using conventional optimization techniques; again, smaller step sizes are expected to yield better results for small error values, and larger step sizes can be used to represent the higher prediction error magnitudes.

The level of the supplementary data $S_2$ on line 151 is also adjusted in a transform circuit 112, which provides an output $Q(S_2)$ at either a first or a second level, depending upon the state of the binary input. The levels are chosen so that after addition to the output of compressor 111, the range of the sum will not exceed the original range of the input samples, and so that the level which was added is uniquely detectable independent of the value of the compressed error signal. In the present example, the first and second levels can be set at 25 and 75 units, respectively, so that the output of adder 115, which combines the outputs $Q(\epsilon)$ and $Q(S_2)$ of compressor 111 and transform circuit 112, respectively, is in the range between 0 and 100 units. Thus, adder output values between 0 and 50 uniquely indicate a first binary state of the supplementary data, while values from 50 to 100 indicate the opposite state.

The preceding level values are only exemplary. In the most general case, the range of the intensity signal $S_1$ input on line 101 is 0 to n, and the range of the error $\epsilon$ output from subtractor 110 is $-n$ to $+n$. Compressor 111 must have a compression ratio of at least 4:1, thus yielding a range between $-n/4$ to $n/4$ and leaving the remaining range $(n/2)$ for superimposition of the supplementary data at levels of $n/4$ or $3n/4$. For a compression ratio of exactly 4:1, ambiguity exists when the output of adder 115 is exactly $n/2$, since the prediction error could be $+n/4$ in such case and the supplementary data value is not then uniquely determined. For this reason, the compression is preferably set at just over 4:1.

The output of adder 115 is coupled to the output 120 of the encoder via a multiplexer switch 118, the position of which is controlled by clock 103. For samples in the first set, switch 118 is positioned as shown in FIG. 1. For the remaining samples, switch 118 couples the stored sample from output 105 of delay line 104 to output 120. In this way, predicted and actual intensity values are alternately made available for transmission, with only the former being compressed and carrying superimposed supplementary data. As stated previously, the first set of samples may comprise every other sample, in which case switch 118 is repositioned upon each output of clock 103. If more accuracy is desired, predicted values may be multiplexed on a less frequent basis, but the capacity of the encoder system to carry supplementary data is correspondingly decreased. Conversely, the first set of samples can include more than half of the samples, but prediction errors will tend to be greater, leading to greater distortion. The first set of samples can also be selected asynchronously, as a function of the values of the other samples to be encoded. For example, the intensity values of pels which surround the pel corresponding to a "potential" first set sample can be evaluated to determine the horizontal and vertical components of the slope that exists in the area of the picture being processed. If a large slope is detected, it may be assumed that an edge exists, and consequently that the prediction will likely be in error. In this event, the sample is not included in the first set, and the intensity value is transmitted with full precision. On the other hand, if the slope is below a threshold value, the intensity prediction is generally accurate, and the sample is included in the first set, so that the prediction error is encoded together with the superimposed supplementary data. The selection process is performed by logic which responds to outputs from delay element 104 and which controls the position of switch 118 instead of clock 103. The same logic is provided in the receiver to identify the samples in the first set, based upon the samples corresponding to the surrounding pels which are transmitted intact.

Figure 4:
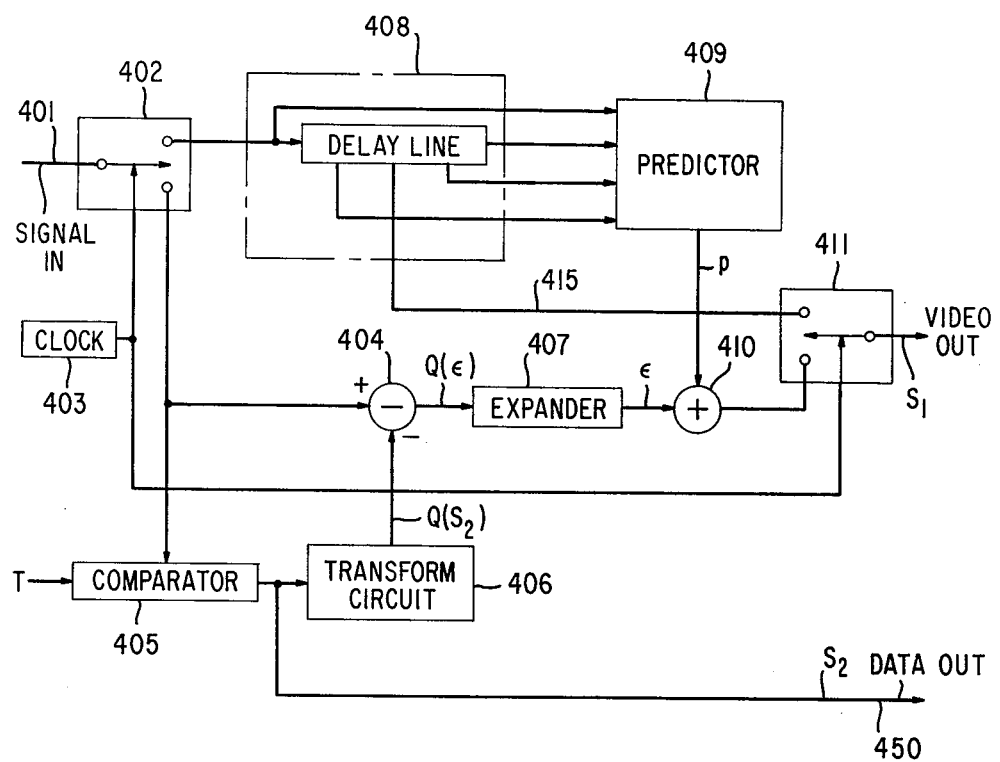
FIG. 4 is a block diagram of a decoder for use in recovering the data encoded with the apparatus of FIG. 1.

The video and supplementary data combined in the encoder of FIG. 1 are separated and decoded in the apparatus of FIG. 4. The input received on line 401 is applied to a demultiplexing switch 402, the position of which is controlled by a clock 403. Samples in the first set which include supplementary data superimposed on the compressed error values are routed to one input of a subtractor 404, and to a comparator 405. The latter detects whether the received value does or does not exceed a threshold value $T_1$ in turn indicating the binary state of the supplementary data, which is recovered on output line 450. The state of the supplementary data also controls the output of a transform circuit 406, which has the same characteristic as circuit 112 of FIG. 1. The output $Q(S_2)$ from circuit 406 is subtracted from the received value in subtractor 404, in order to recover the compressed error $Q(\epsilon)$ for the present sample.

Figure 5:
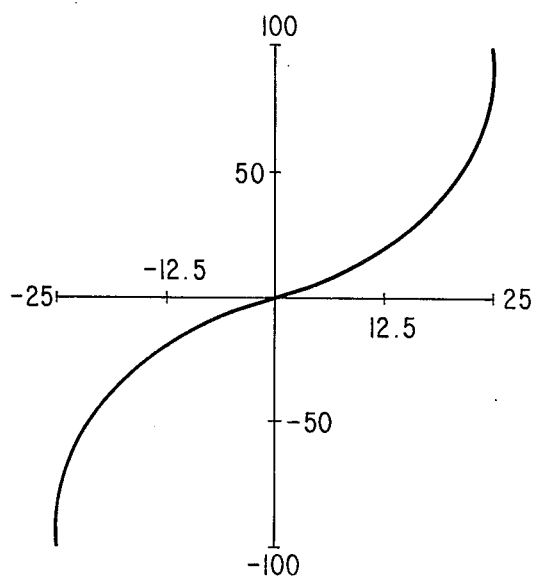
FIG. 5 illustrates the transfer characteristic of expander 407 of FIG. 4.

In order to expand the error $Q(\epsilon)$ to the same levels originally present in the encoder, the output of subtractor 404 is applied to an expander 407 which has characteristics which are the inverse of those of compressor 111 of FIG. 1; as shown in FIG. 5, input levels in the range between $-n/4$ and $n/4$ are non-linearly expanded to the range between $-n$ and $n$. Those skilled in the art will appreciate that some precision is lost in the compression/expansion which occurs in the encoding/decoding processes, particularly for large error values. However, as stated previously, the picture degradation is generally not objectionable.

The recovered error value $\epsilon$ output from expander 407 is combined, in adder 410, with the predicted value p for the corresponding picture element which is computed in the same manner as the predictions in FIG. 1. Specifically, for each sample not in the first set, switch 402 is repositioned to apply the intensity values to delay element 408 which corresponds to delay element 108 of FIG. 1. Intensity values for pels in the neighborhood of the pel being processed are extracted from appropriate taps of delay element 408, and applied to predictor 409, which corresponds to predictor 109 of FIG. 1. The output p of the predictor is then available for updating by combination with the error value $\epsilon$ in adder 410.

Samples corresponding to pels included and excluded from the first set are recombined by switch 411, which is controlled by clock 403. The value for pels in the first set is obtained from adder 410, while the value for other pels is obtained from the middle tap 415 of delay element 408, just as in FIG. 1.

It is to be noted that the technique described above does not result in a total loss of information for samples in the first set since unlike prior art systems, the prediction error values for these samples are not supplanted or replaced. Instead, the value of each sample in the first set is recoverable, but with some loss of precision due to compression/expansion. The addition of supplementary data to the samples in the first set can be conceptualized as a modified form of time division multiplexing wherein some samples contain superimposed values. However, unlike conventional TDM, the selected samples contain information decodable to recover two independent signals. Changes in the frequency spectrum of the composite signal are expected to occur, with more high frequency components being introduced by the superimposition. However, the bandwidth of conventional analog video channels is expected to be adequate to accommodate this increase.

Various modifications and adaptations of the present invention will be apparent to those skilled in the art. Accordingly, it is intended that the invention be limited only by the appended claims.

We claim:

1. Apparatus for transmitting digital data together with a sampled video signal comprising:
    means (109) for predicting the value of each of a first set of samples of said video signal based upon the value of other ones of said video signal samples;
    means (110) for computing the prediction error between the value of each sample in said first set and the corresponding predicted value thereof;
    means (111) for compressing said error to a range narrower than the range of said video signal;
    means (112, 115) for superimposing a value indicative of said digital data on each of said compressed errors, whereby the composite value uniquely indicates the digital data; and
    means (118) for time multiplexing said composite values with the values of said other ones of said video samples.

2. The invention defined in claim 1 wherein said first set of samples includes alternate samples in each scan line of said video signal.

3. The invention defined in claim 1 wherein said apparatus further includes means for determining the slope of the intensity in the area of the picture being processed, and
    means responsive to said slope determining means for including samples in said first set only if said slope is below a predetermined threshold.

4. The invention defined in claims 2 or 3 wherein said compressing means includes a non-linear transformation circuit having a compression ratio of at least 4:1.

5. The invention defined in claim 4 wherein said predicting means is arranged to derive the average intensity value in the neighborhood of the pel which corresponds to the one of said samples in said first set presently being processed.

6. A method of transmitting digital data together with a sampled video signal comprising the steps of:
    predicting the value of each of a first set of samples of said video signal based upon the value of other ones of said video signal samples;
    computing the prediction error between the value of each sample in said first set and the corresponding predicted value thereof;
    compressing said error to a range narrower than the range of said video signal;
    superimposing a value indicative of said digital data on each of said compressed errors, whereby the composite value uniquely indicates the digital data; and time multiplexing said composite values with the values of said other ones of said video samples.

7. The method defined in claim 6 wherein said first set of samples includes alternate samples in each scan line of said video signal.

8. The method defined in claim 6 further including the step of including samples in said first set only if the slope of the intensity in the area of the picture being processed is below a predetermined threshold.

9. The method defined in claims 7 or 8 wherein said compressing step includes non-linearly transforming said error with a compression ratio of at least 4:1.

10. The method defined in claim 9 wherein said predicting step includes averaging the intensity values in the neighborhood of the pel which corresponds to the one of said samples in said first set presently being processed.

11. Apparatus for encoding a supplementary data signal together with a video signal which represents the intensity values of a plurality of elements of a picture, comprising:

means for forming predictions of the intensity values of a first series of picture elements based upon the intensity values of surrounding elements;

means for determining the error between each of said intensity values in said first series and the corresponding prediction;

means for compressing the error for each prediction in accordance with a predefined transformation characteristic;

means for superimposing a value uniquely identifying a bit of said supplementary data on each compressed error; and means for multiplexing the superimposed values with the intensity values of remaining ones of said picture elements.

12. The invention defined in claim 11 wherein said first series includes alternate picture elements.

13. The invention defined in claim 11 wherein said apparatus further includes means responsive to said remaining picture elements for determining the locations of edges in said picture, and wherein said first series includes alternate picture elements which are not near any of said edges.

14. The invention defined in claim 11 wherein said compressing means includes a non-linear quantizer.

15. The invention defined in claim 14 wherein said superimposing means includes (a) means responsive to each bit said data signal for providing a first or second output value which does not exceed the range of said intensity values when combined with said compressed error, and (b) means for combining said first or second output value with said compressed error.

* * * * *